(12) United States Patent
Kim

(10) Patent No.: US 9,354,075 B2
(45) Date of Patent: May 31, 2016

(54) VEHICLE AND METHOD OF CONTROLLING THE SAME

(71) Applicant: Hyundai Motor Company, Seoul (KR)

(72) Inventor: Sung Un Kim, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/562,685

(22) Filed: Dec. 6, 2014

(65) Prior Publication Data

US 2016/0084669 A1 Mar. 24, 2016

(30) Foreign Application Priority Data

Sep. 23, 2014 (KR) .......................... 10-2014-0126903

(51) Int. Cl.
*G01C 21/36* (2006.01)
(52) U.S. Cl.
CPC ................................. *G01C 21/3629* (2013.01)
(58) Field of Classification Search
CPC ............ B60W 40/09; B60W 2040/13; B60W 2050/0013; B60W 2050/0031; B60W 2520/14; B60W 2530/20; B60W 2720/14; B60W 30/045; B60W 40/101; B60W 40/103; B60W 50/14; B60W 50/16; B60K 2350/906; B60K 2350/962; B60R 11/04; B60R 2300/60; B60R 2300/602; B60R 2300/605; B60R 2300/8093; B60T 8/1725; G01F 9/001; G01S 13/42; G01S 13/82; G01S 13/86; G01S 13/931; G01S 17/936; G01S 19/42; G01S 19/45; G01S 2013/9353; G01S 2013/936; G01S 2013/9375; G07C 5/008; G07C 5/0808; G07C 5/0816; G07C 5/0841; G08B 21/06; G08G 1/0133; G08G 1/04; G08G 1/096716; G08G 1/166; G08G 1/167; H04M 1/663

USPC ................................ 701/1, 38, 123; 340/576
See application file for complete search history.

(56) References Cited

U.S. PATENT DOCUMENTS

| 2004/0252027 A1* | 12/2004 | Torkkola ................ G08B 21/06 340/576 |
| 2005/0154513 A1* | 7/2005 | Matsunaga ........... B60T 8/1725 701/38 |
| 2005/0216136 A1* | 9/2005 | Lengning .............. B60W 40/09 701/1 |

(Continued)

FOREIGN PATENT DOCUMENTS

| JP | H09319999 A | 12/1997 |
| JP | 2003-016584 A | 1/2003 |

(Continued)

OTHER PUBLICATIONS

Korean Office Action for Korean Patent Application No. 10-2014-0126903, English translation, 8 pages.

*Primary Examiner* — James Trammell
*Assistant Examiner* — Sanjeev Malhotra
(74) *Attorney, Agent, or Firm* — Mintz Levin Cohn Ferris Glovsky and Popeo, P.C.; Peter F. Corless

(57) ABSTRACT

A vehicle and a method of controlling the vehicle using voice guidance is provided. The vehicle includes a body that defines an appearance of the vehicle and a vehicle sensor that is configured to sense various driving-related situations of the vehicle. A driving guide system is then configured to analyze vehicle driving data including vehicle sensing information received form the vehicle sensor and driving-related information and prioritize the vehicle driving data. In addition, the driving guide system is configured to generate driving guide information in a scenario format based on a priority and output the driving guide information by voice guidance.

19 Claims, 12 Drawing Sheets

(56) References Cited

U.S. PATENT DOCUMENTS

2008/0300733 A1* 12/2008 Rasshofer ............... G01S 13/42
 701/1
2012/0053824 A1* 3/2012 Nam ....................... G01F 9/001
 701/123

FOREIGN PATENT DOCUMENTS

| JP | 2009-184633 A | 8/2009 |
| JP | 2013-122720 A | 6/2013 |
| KR | 10-2006-0058215 A | 5/2006 |
| KR | 2010-0035253 A | 4/2010 |

* cited by examiner

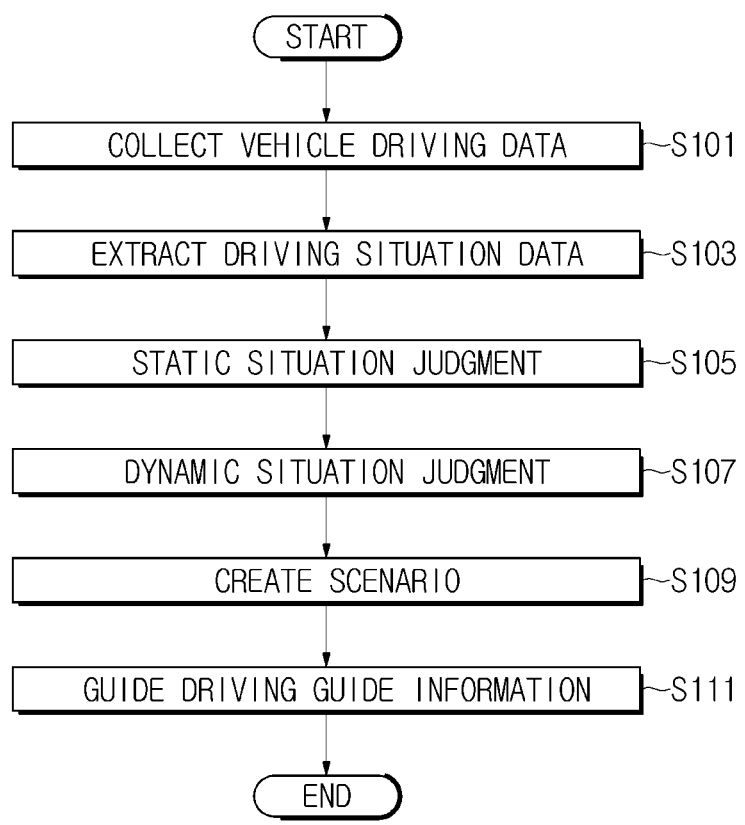

VEHICLE AND METHOD OF CONTROLLING THE SAME

CROSS-REFERENCE TO RELATED APPLICATION(S)

This application claims the benefit of Korean Patent Application No. 10-2014-0126903, filed on Sep. 23, 2014, in the Korean Intellectual Property Office, the disclosure of which is incorporated herein by reference.

BACKGROUND

1. Field of the Disclosure

The present disclosure relates to vehicles and methods of controlling vehicles using voice guidance.

2. Description of the Related Art

A variety of vehicle safety apparatuses for improving driving convenience and stability of drivers are currently being developed. More particularly, examples of such vehicle safety apparatuses include lane-departure warning apparatuses that assist in vehicle manipulation to prevent departure from a driving lane and navigation systems that guide a vehicle along a route to a destination selected by a driver and provides surrounding traffic information in accordance with the route. A navigation system generally includes an audio apparatus and a video apparatus that allows a driver to listen to the music and watch a video while driving in addition to providing route information. Recently, audio video navigation (AVN) apparatuses in which an audio apparatus, a video apparatus, and a navigation system are integrated are installed within vehicles.

Furthermore, vehicles provide road guidance using a navigation system, front, rear, and side traffic alerts, and lane-departure warnings. Although the navigation system provides overall situations on roads such as traffic congestion and road guidance or designated plans, such a system cannot provide real-time traffic situations surrounding the vehicle. In addition, although sensors of a vehicle provide warnings based on respective functions thereof, synthetic determination and guidance are not provided.

SUMMARY

An aspect of the present disclosure provides a vehicle that integrates information collected by a plurality of vehicle sensors installed within the vehicle, analyzes and prioritizes the information, and provides a voice guidance in a scenario format, and a method of controlling the vehicle. Additional aspects of the disclosure will be set forth in part in the description which follows and, in part, will be obvious from the description, or may be learned by practice of the disclosure.

In accordance with one aspect of the present disclosure, a vehicle may include a body that defines an appearance of the vehicle, a vehicle sensor configured to sense various driving-related situations of the vehicle, and a driving guide system configured to analyze vehicle driving data including vehicle sensing information received from the vehicle sensor and driving-related information, prioritize the vehicle driving data, generate driving guide information in a scenario format in accordance with the priority, and output the driving guide information using voice guidance.

The driving guide system may be configured to extract driving situation data acquired by classifying the vehicle driving data according to situation. The driving guide system may also be configured to prioritize the driving situation data in descending or ascending order of distance from the vehicle. The driving guide system may then be configured to classify the driving situation data into static situation data and dynamic situation data and prioritize the data by assign or provide marks thereto based on the situation. The driving guide system may be configured to assign higher marks and higher priorities to the static situation data of fixed objects in descending order of distance from the vehicle.

The static situation data may include location-based information including destination, route, intersection, driving lane, building name, traffic sign, traffic congestion information, and construction information. The driving guide system may be configured to assign higher marks and higher priorities to the dynamic situation data of moving objects in ascending order of distance from the vehicle. The dynamic situation data may include vehicle speed of the traveling vehicle and other vehicles, distance from adjacent vehicles, distance from fence and median strip or other barrier, information regarding right-turn and left-turn, and sudden braking information.

The driving guide system may be configured to generate driving guide information in a scenario format based on the priority to guide the static situation data before the dynamic situation data. The driving guide system may further be configured to generate driving guide information based on the dynamic situation data when a destination is not set by a user. The vehicle may further include a navigation system configured to provide route driving information from a starting point of the vehicle to a destination, and the vehicle driving data may further include the route driving information received from the navigation system. The vehicle sensor may include a radar sensor, an ultrasound sensor, a vehicle speed sensor, an imaging device, and a global positioning system sensor.

In accordance with another aspect of the present disclosure, a method of controlling a vehicle may include collecting vehicle driving data acquired by sensing various driving-related states of the vehicle, prioritizing the vehicle driving data by analyzing the vehicle driving data, generating driving guide information in a scenario format in accordance with priority, and outputting the driving guide information as a voice.

In the prioritization of the vehicle driving data, driving situation data may be extracted from the vehicle driving data. In addition, priority may be assigned to the driving situation data based on the distance from the traveling vehicle. The situation data may be classified into static situation data and dynamic situation data, and priority may be determined by assigning marks to the driving situation data based on the situation.

Higher marks and higher priorities may be assigned to the static situation data of fixed objects in descending order of distance from the vehicle. In addition, higher marks and higher priorities may be assigned to the dynamic situation data of moving objects in ascending order of distance from the vehicle (e.g., the traveling vehicle or the subject vehicle). In the generation of driving guide information, the driving guide information may be generated based on the priority to guide the static situation data before the dynamic situation data. In addition, the driving guide information may be generated based on the dynamic situation data when a destination is not set by a user.

The vehicle driving data may include location-based static situation data including destination, route, intersection, driving lane, building name, traffic sign, traffic congestion information, and construction information and dynamic situation data including vehicle speed of the vehicle itself and other vehicles, distance from adjacent vehicles, distance from fence and median strip or other barher, information about right-turn and left-turn, and sudden braking information. In the collecting of vehicle driving data, route driving information of a navigation system may further be collected as the vehicle driving data.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 12 is an exemplary flowchart for describing a method of controlling a vehicle according to an exemplary embodiment of the present disclosure.

DETAILED DESCRIPTION

Figure 1:
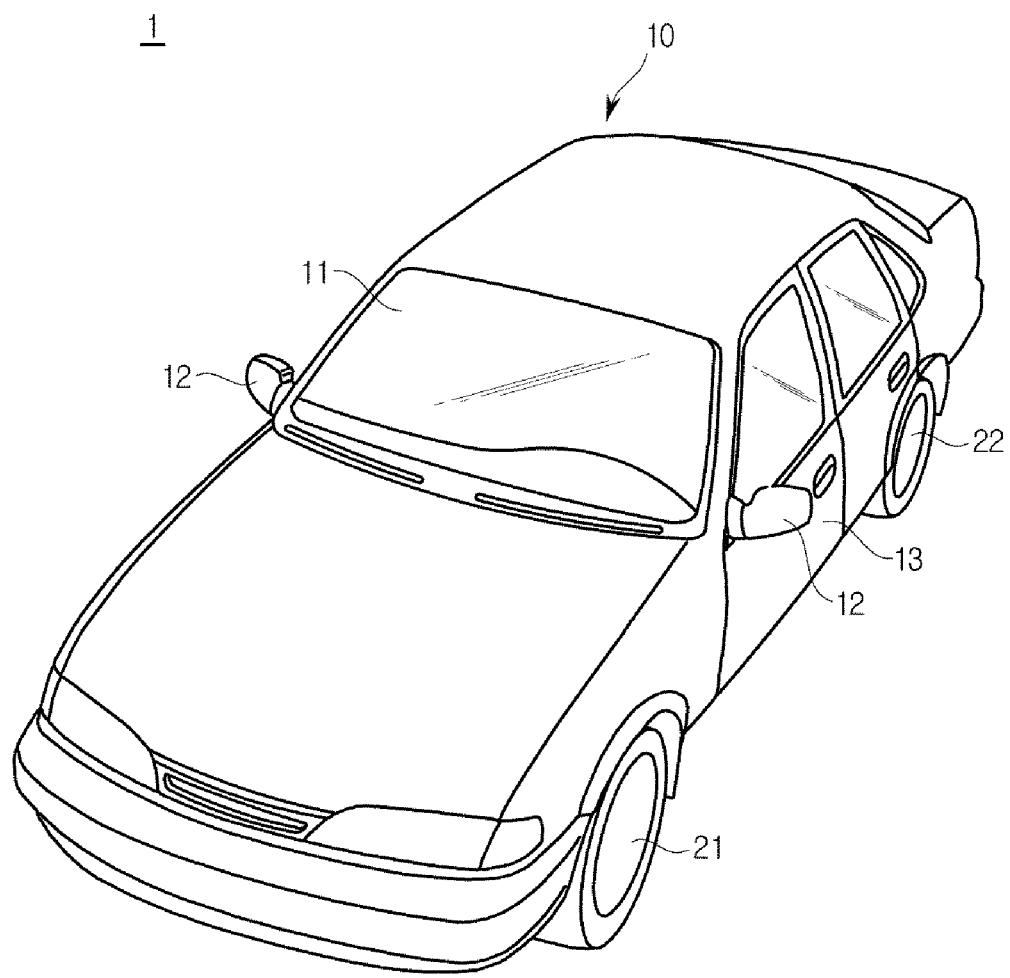
FIG. 1 is an exterior view of a vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Reference will now be made in detail to the exemplary embodiments of the present disclosure, examples of which are illustrated in the accompanying drawings, wherein like reference numerals refer to like elements throughout. In the drawings, the same or similar elements are denoted by the same reference numerals even though they are depicted in different drawings. In the following description of the exemplary embodiments, a detailed description of known functions and configurations incorporated herein will be omitted when it may make the subject matter of the exemplary embodiments rather unclear. Herein, the terms first, second, etc. are used simply to discriminate any one element from other elements, and the elements should not be limited by these terms.

Hereinafter, exemplary embodiments of the present disclosure will be described with reference to the drawings.

Figure 2:
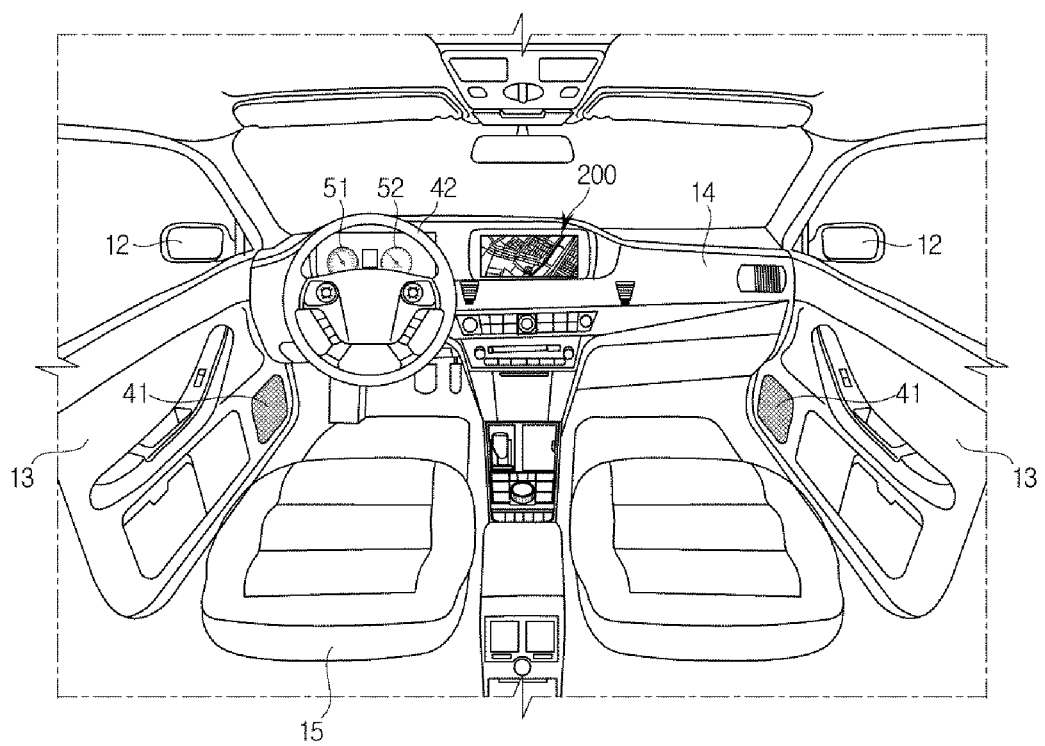
FIG. 2 is an interior view of the vehicle in FIG. 1 according to an exemplary embodiment of the present disclosure.

FIG. 1 is an exterior view of a vehicle 1 and FIG. 2 is an interior view of the vehicle 1. Referring to FIG. 1, the exterior of the vehicle 1 may include a body 10 that defines an appearance of the vehicle 1, a windscreen 11 configured to provide a driver with a forward view of the vehicle 1, side mirrors 12 configured to provide the driver with rear views of the vehicle 1, doors 13 configured to shield the interior of the vehicle 1 from the exterior, and wheels 20 configured to move the vehicle 1 and including front wheels 21 disposed at front portions of the vehicle 1 and rear wheels 22 disposed at rear portions of the vehicle 1.

The windscreen 11 may be disposed at a front upper portion of the body 10 to allow the driver sitting within the vehicle 1 to acquire visual information regarding the forward view of the vehicle 1. In addition, the side mirrors 12 may include a left side mirror disposed at the left side of the body 10 and a right side mirror disposed at the right side of the body 10 and allow the driver sitting within the vehicle 1 to acquire visual information about the side views and rear view of the vehicle 1. The doors 13 may be pivotally coupled to the body 10 at left and right sides and the driver enter the vehicle 1 by opening the door 13 and the interior of the vehicle 1 may be shielded from the exterior by closing the door 13.

Referring to FIG. 2, the interior of the vehicle 1 may include a dashboard 14 on which various devices used for the driver manipulation of the vehicle 1 may be installed, a driver seat 15 where the driver of the vehicle 1 sit, instrument clusters 51 and 52 configured to display operation information regarding the vehicle 1, and a navigation system 200 configured to provide route guidance information based on a user manipulation instruction. In particular, the navigation system 200 may be an audio video navigation (AVN) apparatus configured to provide audio and video functions in addition to the route guidance information.

The dashboard 14 may protrude toward the driver from a lower portion of the windscreen 11, and the driver may manipulate the various devices mounted on the dashboard 14 while driving the vehicle in a forward looking position. Since the driver seat 15 is disposed at a position facing the dashboard 14, the driver may drive the vehicle 1 in a stable position while watching the forward direction of the vehicle 1 and the various devices mounted on the dashboard 14. The instrument clusters 51 and 52 may be mounted on the dashboard 14 at the driver seat 15 side and may include a speed gauge 51 configured to indicate a speed of the vehicle 1 and a revolutions per minute (rpm) gauge 52 configured to indicate a rotational speed of a power device (not shown).

The navigation system 200 may include a display 110 configured to output and display information regarding a road on which the vehicle 1 is traveling or a route toward a destination selected by the driver and a speaker 41 configured to output sound based on user manipulation instruction. In addition, the vehicle 1 may further include a power device (not shown) configured to rotate the wheels 21 and 22, a steering device (not shown) used to change a traveling direction of the vehicle 1, and a brake device (not shown) configured to stop movement of the wheels 21 and 22. The power device may be configured to provide a rotational force to the front wheels 21 or the rear wheels 22 to cause the vehicle body 10 to move forward or backward. The power device may include an engine configured to generate a rotational force by burning a fossil fuel or a motor configured to generate a rotational force upon receiving power from a capacitor (not shown).

The steering device may include a steering handle 42 through which a driving direction may be input by the driver, a steering gear (not shown) configured to convert rotational movement of the steering handle 42 into reciprocation movement, and a steering link (not shown) configured to transfer the reciprocation movement of the steering gear (not shown) to the front wheels 21. The steering device may be configured to change the driving direction of the vehicle 1 by changing a direction of a rotating shaft of the wheels 20. The brake device may include a brake pedal (not shown) through which a braking instruction may be input (e.g., the brake pedal may be engaged to decrease the speed of the vehicle or stop the vehicle), a brake dram (not shown) coupled to the front and rear wheels 21 and 22, and brake shoes (not shown) configured to brake the rotation of the brake drum (not shown) using a frictional force. The brake device may be configured to stop driving of the vehicle 1 by stopping the rotation of the front and rear wheels 21 and 22.

Figure 3:
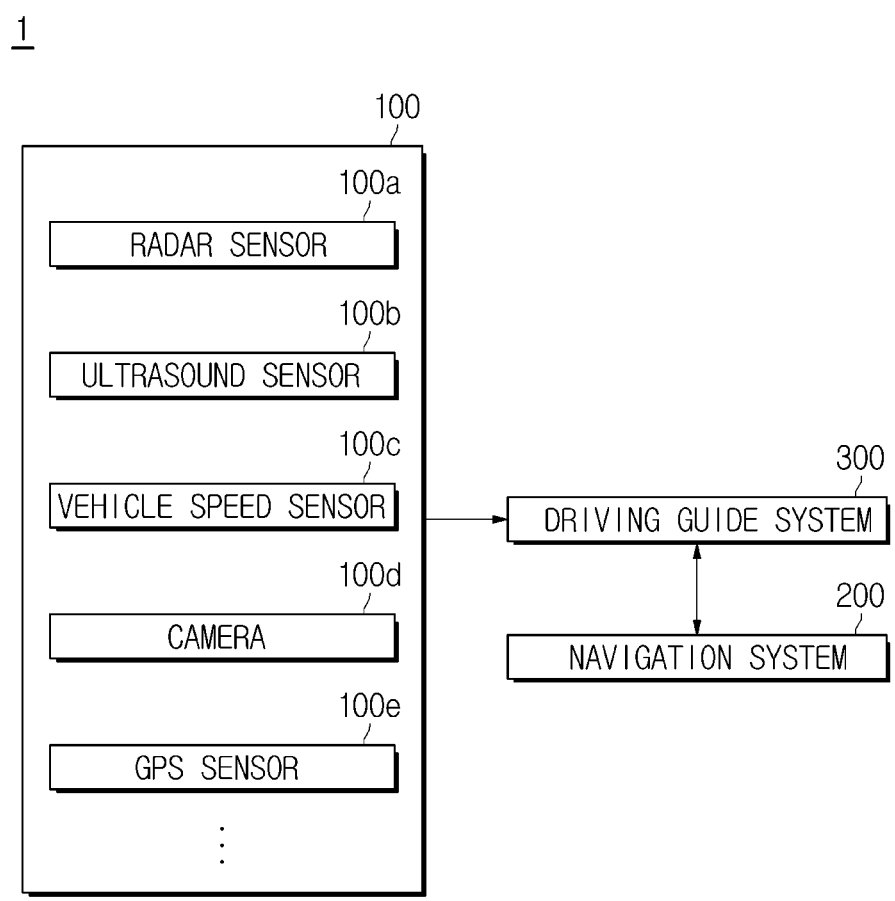
FIG. 3 is an exemplary block diagram illustrating a configuration to control a vehicle according to an exemplary embodiment of the present disclosure.

FIG. 3 is an exemplary block diagram illustrating a configuration to control the vehicle 1 according to an exemplary embodiment of the present disclosure. Hereinafter, a method of providing driving guide information will be described with reference to FIG. 5. Referring to FIG. 3, the vehicle 1 may include a vehicle sensor 100, a navigation system 200, and a driving guide system 300.

The vehicle sensor 100 may be configured to sense various driving-related states and may be installed within the vehicle 1. In particular, the vehicle sensor 100 may include a radar sensor 100a, an ultrasound sensor 100b, a vehicle speed sensor 100c, an imaging device 100d, a global positioning system (GPS) sensor 100e, and the like. The navigation system 200 may be configured to provide route driving information from a starting point of the vehicle 1 toward a destination.

The driving guide system 300 may be configured to analyze vehicle driving data including vehicle sensing information received from the vehicle sensor 100 and driving-related information, prioritize the vehicle driving data, generate driving guide information in a scenario format, and output the driving guide information through a speaker (not shown) by voice (e.g., voice guidance). In particular, the vehicle driving data may further include route driving information received from the navigation system 200. The driving guide information may be information describing situations occurring while driving the vehicle 1 as a scenario and may be generated by integrating information acquired by the vehicle sensor 100, information acquired by a global positioning system (GPS), map information, and the like, analyzing and prioritizing the integrated information, and generating a scenario of the driving guide information.

Figure 5:
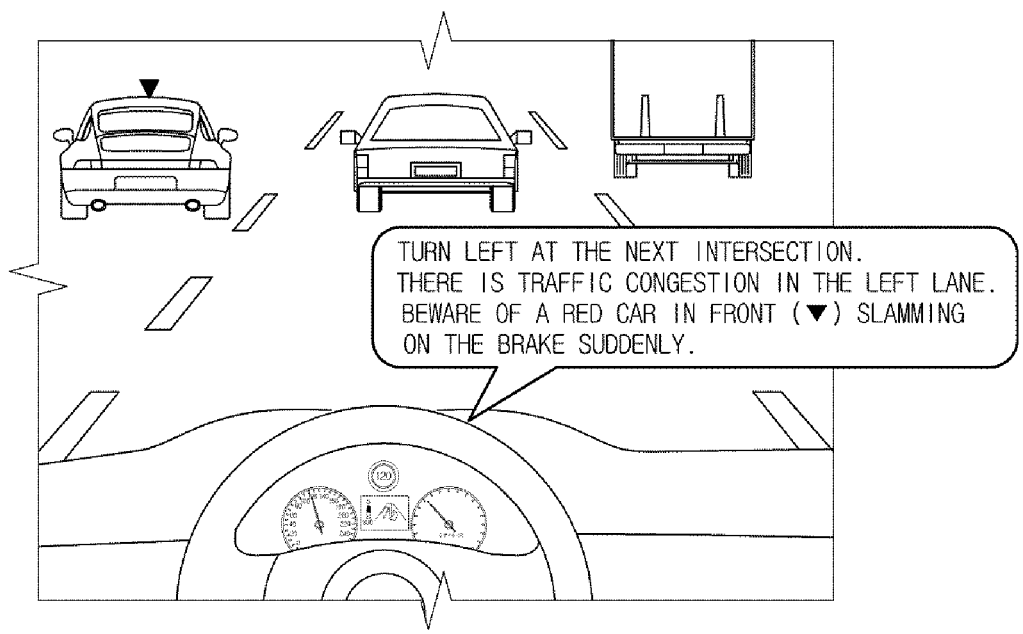
FIG. 5 is an exemplary diagram describing a method of providing driving guide information according to an exemplary embodiment of the present disclosure.

For example, as illustrated in FIG. 5, since the driving guide system 300 may provide a scenario by integrating a currently sensed traffic situations surrounding the vehicle 1 in a current driving route of the vehicle 1, which travels in accordance with the driving guide information, and driving states of other vehicles, for example, "Turn left at the next intersection. There is traffic congestion in the left lane. Beware of a red car in front (▼) slamming on the brake suddenly," the driver may recognize the driving states and may have improved driving convenience. In addition, since the driving guide system 300 may provide driving guide information as a scenario generated based on priority by reflecting real-time static and dynamic situations surrounding the vehicle 1, for example, "400 M ahead, turn left at the intersection. There is a vehicle in the left lane. Change lanes after the vehicle passes you or change lanes in front of the vehicle after passing the vehicle, a substantial assistance for driving the vehicle 1 may be provided to the driver.

Figure 4:
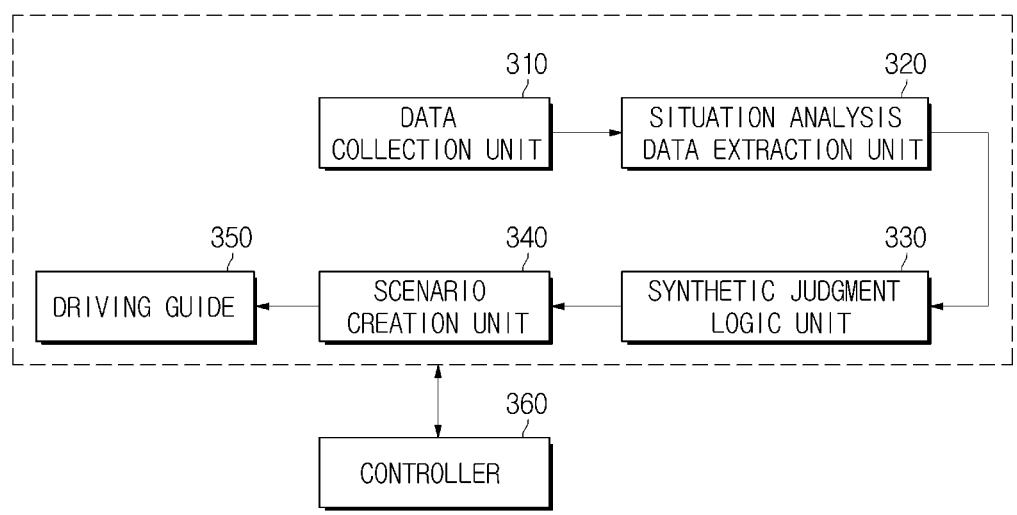
FIG. 4 is an exemplary detailed block diagram illustrating a driving guide system of FIG. 3 according to an exemplary embodiment of the present disclosure.

FIG. 4 is an exemplary block diagram illustrating the driving guide system 300 of FIG. 3 in more detail. Hereinafter, a method of generating driving guide information will be described with reference to FIGS. 6 to 8. As illustrated in FIG. 4, the driving guide system 300 may include a data collection unit 310, a situation analysis data extraction unit 320, a synthetic determination logic unit 330, a scenario creation unit 340, a driving guide 350, and a controller 360. The controller 360 may be configured to operate the data collection unit 310, the situation analysis data extraction unit 320, the synthetic determination logic unit 330, the scenario creation unit 340, and the driving guide 350.

The data collection unit 310 may be configured to collect vehicle driving data including vehicle sensing information received from the vehicle sensor 100 and driving-related information. In particular, the vehicle sensing information may refer to information acquired by various sensors including a radar sensor 100a, an ultrasound sensor 100b, a vehicle speed sensor 100c, an imaging device (e.g., a camera, a video camera, and the like) 100d, and a GPS sensor 100e, and a driving-related information may refer to various information set and stored in the vehicle 1, such as map information.

The situation analysis data extraction unit 320 may be configured to extract driving situation data obtained by classifying the acquired vehicle driving data according to driving situation. For example, driving situation data may include location-based static situation data such as destination, route, intersection, driving lane, building name, traffic sign, traffic congestion information, and construction information and dynamic situation data including vehicle speed of the vehicle 1 (e.g., the traveling or the subject vehicle) and other vehicles, distance from adjacent vehicles, distance from fence and median strip or other road barriers, information regarding right-turn and left-turn, and sudden braking information. The synthetic determination logic unit 330 may be configured to prioritize information considered important for ensuring a driver's safe, such as, driving situation data, in descending or ascending order of distance from the vehicle 1. In particular, driving situation data being considered significant may include a distance from a front vehicle (e.g., a proceeding vehicle), a distance from a crossroads ahead, existence of a vehicle in the left lane, a distance from a rear vehicle (e.g., a preceding vehicle), and a left-turn TBT signal.

Figure 6:
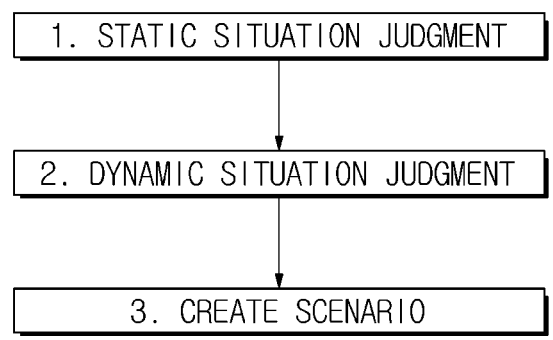
FIGS. 6 to 8 are exemplary diagrams describing a method of creating driving guide information according to an exemplary embodiment of the present disclosure.

As illustrated in FIG. 6, the synthetic determination logic unit 330 may be configured to perform static situation determination and dynamic situation determination, and then the scenario creation unit 340 may be configured to generate a scenario based on priority obtained as a result of the static situation determination and dynamic situation determination. More particularly, the synthetic determination logic unit 330 may be configured to classify driving situation data into static situation data and dynamic situation data and prioritize the driving situation data by assigning or providing marks to the driving situation data based on the situation.

Further, the synthetic determination logic unit 330 may be configured to assign higher marks and higher priorities to static situation data of fixed objects in descending order of distance from the vehicle 1. Static situation data including information regarding non-moving objects, locations of which are fixed, may be location-based information including destination, route, intersection, driving lane, building name, traffic sign, traffic congestion information, and construction information. The synthetic determination logic unit 330 may be configured to assign higher marks to static situation data in descending order of distance from the vehicle 1. The higher the mark provided to the static situation data is, the higher a priority the data is assigned. That is, as the mark increases, the priority increases, For example, when there are a plurality of pieces of static situation data including intersection in 100 m, left-turn in 80 m, traffic congestion in 50 m, and left-turn lane starting from 70 m ahead, the synthetic determination logic unit 330 may be configured to assign 10 points (e.g., marks) to the route, 9 points to the left-turn, 7 points to the left-turn lane, and 5 points to the traffic congestion. In particular, among the route changes, information regarding a substantially distant location unnecessary to be provided to the driver or a complex road may be altered with information about surroundings of the vehicle 1.

In addition, the synthetic determination logic unit 330 may be configured to assign higher marks and higher priorities to dynamic situation data of moving objects in ascending order of distance from the vehicle 1. The dynamic situation data may include vehicle speeds of the vehicle 1 (e.g., the traveling vehicle or the subject vehicle) and other vehicles, distance from adjacent vehicle, distance from fence and median strip or other barrier, information regarding right-turn and left-turn, and sudden braking information. In particular, the marks may be assigned to dynamic situation data according to predicted distance-to-collision, and the priorities may be assigned in the same manner as the marks. In other words, the synthetic determination logic unit 330 may be configured assign higher marks and higher priorities to dynamic situation data as the moving objects are closer to (e.g., approach or the distances to the vehicle decreases) the vehicle 1.

For example, when a speed of the vehicle 1 is 50 km/h, there is dynamic situation data including a vehicle travelling in front at a distance of 30 m, a vehicle travelling in the left lane in front at a distance of 15 m at a speed of 55 km/h, a vehicle travelling in the left lane in a rear position at a distance of 20 m at a speed of 60 km/h, the synthetic determination logic unit 330 may be configured to assign 10 points to distance from the front vehicle, 8 points to distance from the vehicle travelling in the left lane in front, and 7 points to distance from the vehicle travelling in the left lane at a rear position of the traveling vehicle.

Moreover, when the destination is not set by a user, the synthetic determination logic unit 330 may be configured to generate driving guide information based on the dynamic situation data. The scenario creation unit 340 may be configured to generate a scenario based on the priority of the static situation data and the priority of the dynamic situation data determined by the synthetic determination logic unit 330. In addition, the scenario creation unit 340 may be configured to generate the driving guide information as a scenario based on the priority such that the static situation data may be provided prior to the dynamic situation data although the driving guide information is generated based on the priority. However, the present disclosure is not limited thereto, and the order of guiding the data may be changed, if required.

Figure 7:
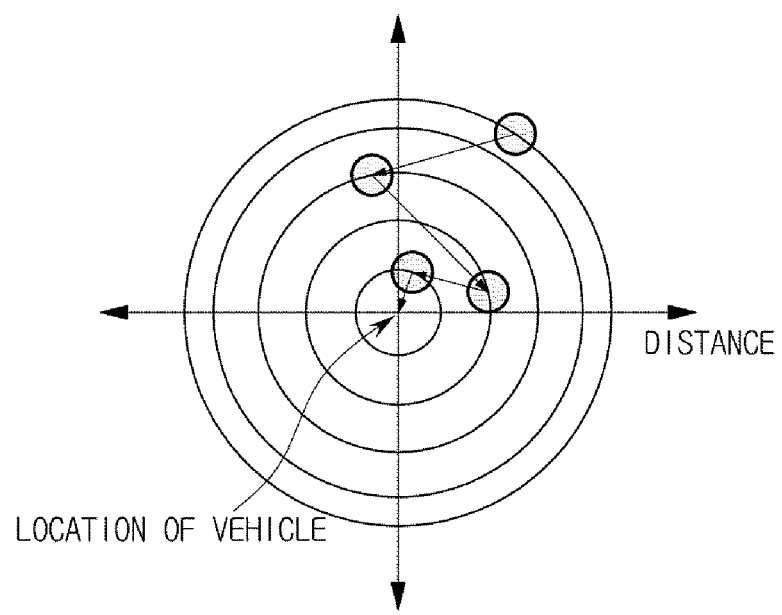
Figure 8:
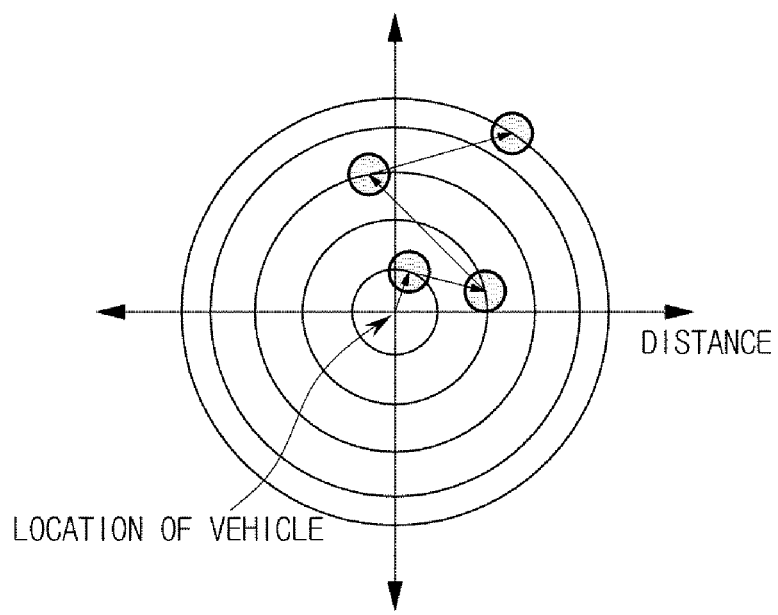

The dynamic situation data may be guided after the static situation data, since more urgent dynamic situation data than the static situation data may be recognized by the user. For example, the scenario creation unit 340 may be configured to provide the driving guide information to guide the static situation data to provide information regarding a fixed object farther from the vehicle 1 before information regarding a fixed object closer to the vehicle 1 as illustrated in FIG. 7, and the dynamic situation data may be guided to provide information regarding a moving object closer to the vehicle 1 before information regarding a moving object farther from the vehicle 1 as illustrated in FIG. 8.

When a destination is not input, the scenario creation unit 340 may be configured to generate a scenario using the dynamic situation data. For example, the driving guide information generated in a scenario format may provide a voice guidance "Left-turn at the next intersection. There is traffic congestion. Beware of front vehicle when changing lanes. Beware more of front vehicle than the rear vehicle in the left lane since the front vehicle is closer than the rear vehicle." In addition, upon receiving a warning from a front collision warning (FCW) system when an obstacle is substantially close (e.g., within a predetermined distance from the traveling vehicle), independently from the static situation data, the scenario creation unit 340 may be configured to guide dynamic situation data before static situation data.

Meanwhile, when the vehicle 1 operates in association with various driving assistant devices equipped within the vehicle 1, a control by a driving assistant device such as a FCW system may be output before driving guide information in a sudden driving situation, or the sudden driving situation may be guided while providing driving guide information upon receiving information regarding sudden situation from the driving assistant device. The driving guide 350 may be configured to output driving guide information generated by the scenario creation unit 340 as a voice guidance. In addition, when a particular factor (e.g., distance from front vehicle) is psychologically important to the driver, the driving guide 350 may be configured to output the voice guidance of the driving guide information when the factor arises as an event. Alternatively, the driving guide 350 may be configured to periodically guide the driving guide information when particular events (e.g., destination, emergency situation, and region of interest) are not generated. The controller 360 may be configured to execute overall operation of the driving guide system 300.

Figure 9:
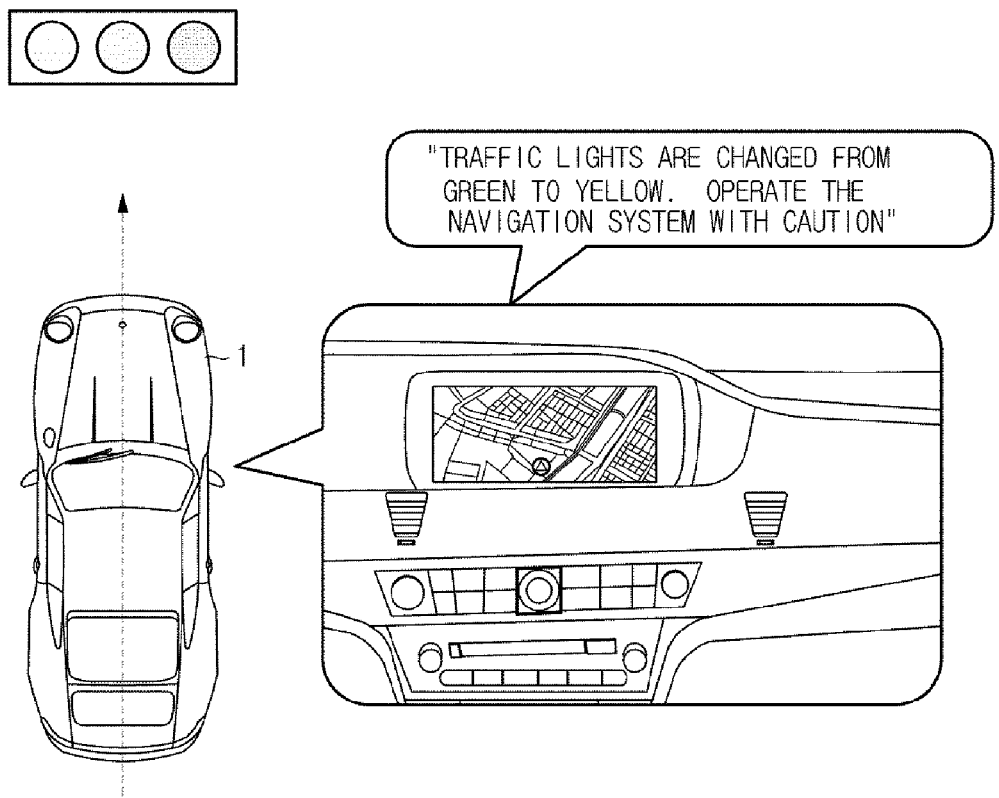
FIG. 9 is an exemplary diagram describing driving guide information according to an exemplary embodiment of the present disclosure.

FIG. 9 is an exemplary diagram for describing driving guide information according to an exemplary embodiment. As illustrated in FIG. 9, when traffic lights are present while driving the vehicle 1, the driving guide system 300 may be configured to provide the current state of the traffic lights as driving guide information. For example, the driving guide system 300 may be configured to output driving guide information "Traffic lights are changed from green to yellow. Operate the navigation system 200 with caution." as a voice guidance. In particular, the driving guide system 300 may be configured to generate driving guide information such that traffic lights are guided (e.g., output) before the navigation system 200 since a priority of the traffic lights (static situation data) farther from the vehicle 1 is higher than a priority of the navigation system 200 (static situation data).

Figure 10:
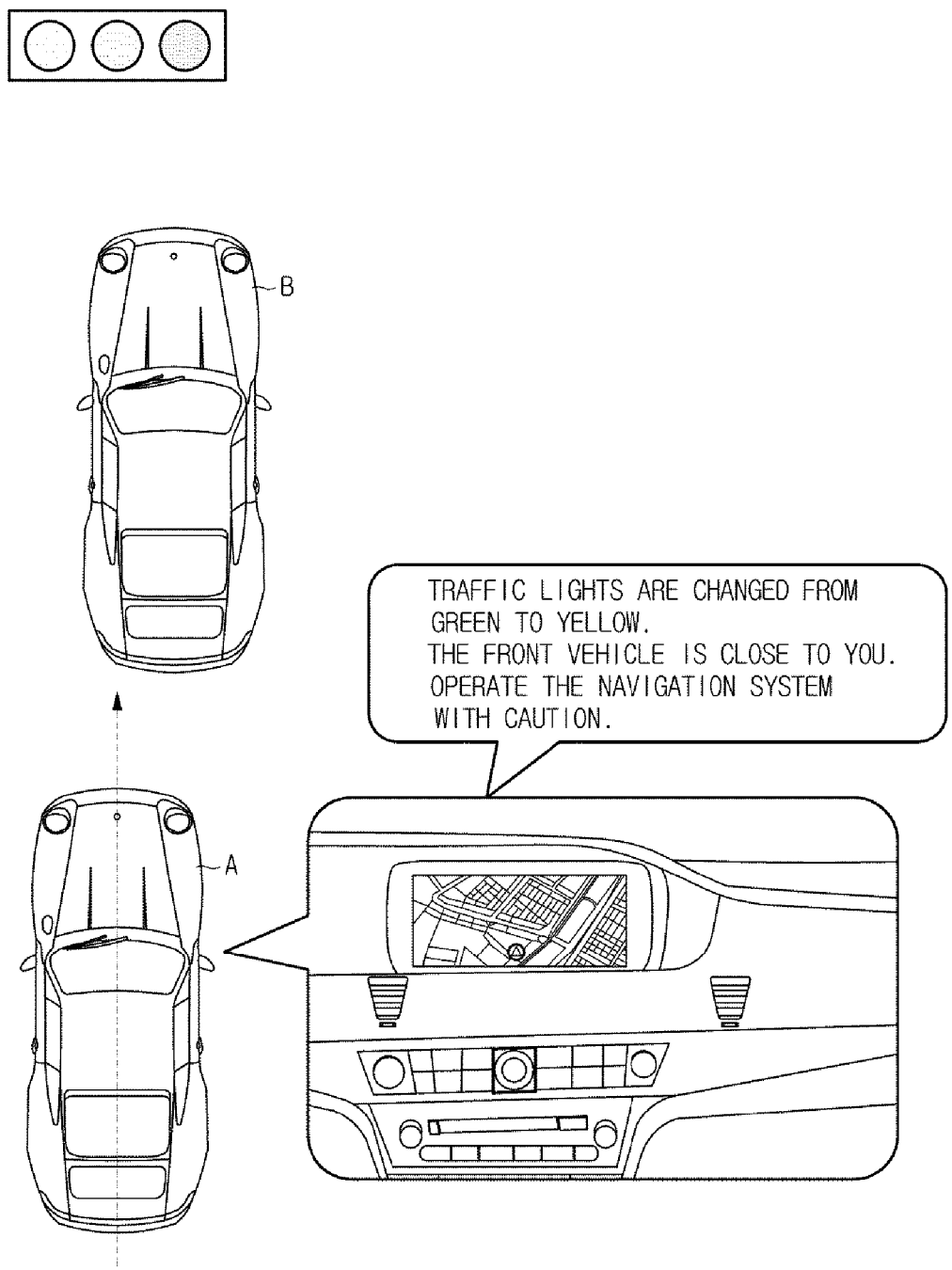
FIG. 10 is an exemplary diagram describing driving guide information according to another exemplary embodiment of the present disclosure.

FIG. 10 is an exemplary diagram describing driving guide information according to another exemplary embodiment. As illustrated in FIG. 10, when a vehicle B is travelling in front of a subject vehicle A and traffic lights are present, the driving guide system 300 may be configured to guide the current states of the front vehicle B and the traffic lights as driving guide information. For example, the driving guide system 300 may be configured to output driving guide information "Traffic lights are changed from green to yellow. The front vehicle is close to you. Operate the navigation system 200 with caution" as a voice guidance. Alternatively, a particular distance to the front vehicle may be output to provide the driver with a distance reference. In particular, the driving guide system 300 may be configured to generate driving guide information to guide traffic lights (static situation data) farther from the vehicle A before the distance from the front vehicle B (dynamic situation data). Then, the navigation system 200 having the lowest priority may be guided in consideration of surrounding situations.

Figure 11:
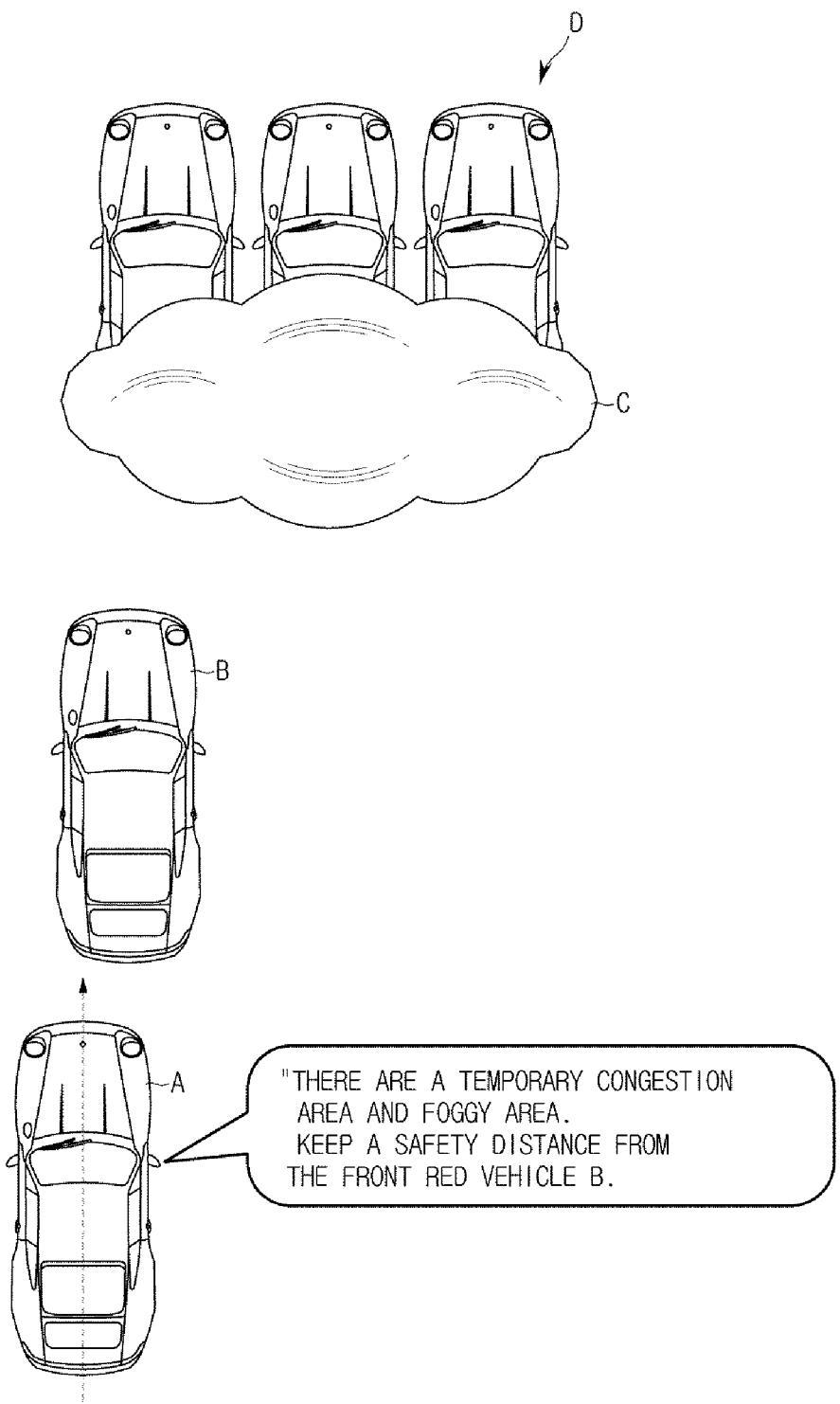
FIG. 11 is an exemplary diagram for describing driving guide information according to another exemplary embodiment of the present disclosure.

FIG. 11 is an exemplary diagram describing driving guide information according to further another exemplary embodiment. As illustrated in FIG. 11, when a vehicle B is travelling in front of a subject vehicle A, a congestion area D of a plurality of vehicles is ahead, and a foggy area C is ahead, the driving guide system 300 may be configured to guide the current states of the front vehicle B and the foggy area C as driving guide information. For example, the driving guide system 300 may be configured to output driving guide information "There is a temporary congestion area and foggy area. Keep a safety distance from the front red vehicle B." as a voice guidance. In particular, the driving guide system 300 may be configured to generate driving guide information to guide the traffic congestion area D (static situation data) farthest from the vehicle A, guide the foggy area C (dynamic situation data), and then guide the state of the vehicle B in front of the subject vehicle A.

FIG. 12 is an exemplary flowchart describing a method of controlling a vehicle. First, the vehicle 1 may be configured to collect vehicle driving data acquired by sensing a variety of driving-related states of the vehicle 1 (S101). The vehicle driving data may include location-based static situation data such as destination, route, intersection, driving lane, building name, traffic sign, traffic congestion information, and construction information and dynamic situation data including vehicle speed of the subject vehicle 1 and other vehicles, distance from adjacent vehicles, distance from fence and median strip, information regarding right-turn and left-turn, and sudden braking information. In addition, in operation S101, the route driving information of the navigation system 200 may be collected as the vehicle driving data.

Then, the vehicle 1 may be configured to prioritize the vehicle driving data via analysis thereof. More particularly, the vehicle 1 may be configured to extract driving situation data from the vehicle driving data (S103). For example, the driving situation data may include location-based static situation data such as destination, route, intersection, driving lane, building name, traffic sign, traffic congestion information, and construction information and dynamic situation data including vehicle speed of the subject vehicle 1 and other vehicles, distance from adjacent vehicles, distance from fence and median strip, information regarding right-turn and left-turn, and sudden braking information.

In addition, the vehicle 1 may be configured to prioritize the driving situation data based on a distance from the subject vehicle. Particularly, the vehicle 1 may be configured to classify the driving situation data into static situation data and dynamic situation data and prioritize the driving situation data by assigning marks thereto based on the situation (S105 and S107). In particular, the vehicle 1 may be configured to assign higher marks and higher priorities to static situation data of fixed objects in descending order of distance from the vehicle 1 and assign higher marks and higher priorities to dynamic situation data of moving objects in ascending order of distance from the vehicle 1.

Further, the vehicle 1 may be configured to generate driving guide information in a scenario format according to the priority (S109). In particular, the vehicle 1 may be configured to generate driving guide information based on the priority to guide the static situation data before the dynamic situation data, without being limited thereto. When the vehicle 1 operates in association with various driving assistant devices equipped within the vehicle 1, a control by a driving assistant device such as a forward collision warning system may be output before driving guide information in a sudden driving situation or the sudden driving situation may be guided while providing driving guide information upon receiving information regarding sudden situation from the driving assistant device.

In addition, when the destination is not set by the user, the vehicle 1 may be configured to generate driving guide information based on the dynamic situation data. Then, the vehicle 1 may be configured to output the driving guide information as a voice guidance (S111). In particular, since the driving guide information may be output as the voice guidance, the driver may determine overall traffic situations including the states of surroundings while driving the vehicle in a forward looking position, thereby improving safety and convenience of the driver.

As is apparent from the above description, according to the present disclosure, driving guide information in a story format may be provided by integrating measurement information of the plurality of vehicle sensors installed within the vehicle and information of the navigation system and prioritizing the information, and thus the driver may recognize surrounding situations of the vehicle. In addition, according to the present disclosure, since the vehicle may provide real-time surrounding situations which may occur while driving the vehicle such as changing of driving lanes and changing of routes in a congestion area and driving guide information according thereto, stability and convenience of driving of the vehicle may be improved.

Although a few exemplary embodiments of the present disclosure have been shown and described, it would be appreciated by those skilled in the art that changes may be made in these exemplary embodiments without departing from the principles and spirit of the disclosure, the scope of which is defined in the claims and their equivalents.

What is claimed is:

1. A vehicle, comprising:
   a body that defines an appearance of the vehicle;
   a vehicle sensor configured to sense vehicle driving data that includes vehicle sensing information and driving-related information; and
   a driving guide system configured to:
      analyze the vehicle driving data received from the vehicle sensor,
      prioritize the vehicle driving data,
      extract driving situation data acquired by classifying the vehicle driving data based on a driving situation,
      classify the driving situation data into static situation data and dynamic situation data,
      prioritize the classified driving situation data by assigning marks thereto based on the driving situation,
      generate driving guide information in a scenario format based on the prioritized data, and
      output the driving guide information through voice.

2. The vehicle according to claim 1, wherein the driving guide system is configured to prioritize the driving situation data in descending or ascending order of distance from the vehicle.

3. The vehicle according to claim 1, wherein the driving guide system is configured to assign higher marks and higher priorities to the static situation data of fixed objects in descending order of distance from the vehicle.

4. The vehicle according to claim 3, wherein the static situation data includes location-based information comprising destination, route, intersection, driving lane, building name, traffic sign, traffic congestion information, and construction information.

5. The vehicle according to claim 1, wherein the driving guide system is configured to assign higher marks and higher priorities to the dynamic situation data of moving objects in ascending order of distance from the vehicle.

6. The vehicle according to claim 5, wherein the dynamic situation data includes vehicle speed of the vehicle and other vehicles, distance from adjacent vehicles, distance from fence and median strip, information regarding a right-turn and a left-turn of the vehicle, and sudden braking information.

7. The vehicle according to claim 1, wherein the driving guide system is configured to generate driving guide information in a scenario format based on the priority to rank the static situation data before the dynamic situation data.

8. The vehicle according to claim 1, wherein the driving guide system is configured to generate driving guide information based on the dynamic situation data when a destination is not set.

9. The vehicle according to claim 1, further comprising:
   a navigation system configured to provide route driving information from a starting point of the vehicle toward a destination,
   wherein the vehicle driving data includes the route driving information received from the navigation system.

10. The vehicle according to claim 1, wherein the vehicle sensor includes a radar sensor, an ultrasound sensor, a vehicle speed sensor, an imaging device, and a global positioning system sensor.

11. A method of controlling a vehicle, comprising:
   collecting, by a controller, vehicle driving data that includes vehicle sensing information and driving-related information using a sensor;
   prioritizing, by the controller, the vehicle driving data by analyzing the vehicle driving data;
   extracting, by the controller, driving situation data acquired by classifying the vehicle driving data based on a driving situation;
   classifying, by the controller, the driving situation data into static situation data and dynamic situation data;
   prioritizing, by the controller, the classified driving situation data by assigning marks thereto based on the driving situation;
   generating, by the controller, driving guide information in a scenario format based on the prioritized data; and
   outputting, by the controller, the driving guide information as a voice guidance.

12. The method according to claim 11, wherein in the prioritization of the vehicle driving data, priority is assigned to the driving situation data based on a distance from the vehicle.

13. The method according to claim 11, wherein higher marks and higher priorities are assigned to the static situation data of fixed objects in descending order of distance from the vehicle.

14. The method according to claim 11, wherein higher marks and higher priorities are assigned to the dynamic situation data of moving objects in ascending order of distance from the vehicle.

15. The method according to claim 11, wherein in the generation of driving guide information, the driving guide information is generated based on the priority to rank the static situation data before the dynamic situation data.

16. The method according to claim 11, wherein in the generation of driving guide information, the driving guide information is generated based on the dynamic situation data when a destination is not set by a user.

17. The method according to claim 11, wherein the vehicle driving data includes location-based static situation data comprising destination, route, intersection, driving lane, building name, traffic sign, traffic congestion information, and construction information and dynamic situation data includes vehicle speed of the vehicle and other vehicles, distance from adjacent vehicles, distance from fence and median strip, information regarding a right-turn and a left-turn of the vehicle, and sudden braking information.

18. The method according to claim 11, wherein in the collection of vehicle driving data, route driving information of a navigation system is collected as the vehicle driving data.

19. A non-transitory computer readable medium containing program instructions executed by a controller, the computer readable medium comprising:
   program instructions that collect vehicle driving data that includes vehicle sensing information and driving-related information using a sensor;
   program instructions that prioritize the vehicle driving data by analyzing the vehicle driving data;
   program instructions that extract driving situation data acquired by classifying the vehicle driving data based on a driving situation;
   program instructions that classify the driving situation data into static situation data and dynamic situation data;
   program instructions that prioritize the classified driving situation data by assigning marks thereto based on the driving situation;
   program instructions that generate driving guide information in a scenario format based on the prioritized data; and
   program instructions that output the driving guide information as a voice guidance.

* * * * *